(12) United States Patent
Sakisaka

(10) Patent No.: US 11,692,461 B2
(45) Date of Patent: Jul. 4, 2023

(54) DRAINAGE STRUCTURE AND TURBOCHARGER

(71) Applicant: IHI Corporation, Tokyo (JP)

(72) Inventor: Ryota Sakisaka, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/646,921

(22) Filed: Jan. 4, 2022

(65) Prior Publication Data

US 2022/0127976 A1   Apr. 28, 2022

Related U.S. Application Data

(63) Continuation of application No. PCT/JP2020/032197, filed on Aug. 26, 2020.

(30) Foreign Application Priority Data

Oct. 9, 2019   (JP) .................................. 2019-185785

(51) Int. Cl.
*F01D 25/32* (2006.01)
*F02B 37/00* (2006.01)
*F02B 47/08* (2006.01)

(52) U.S. Cl.
CPC ............. *F01D 25/32* (2013.01); *F02B 37/00* (2013.01); *F02B 47/08* (2013.01); *F05D 2220/40* (2013.01); *F05D 2260/602* (2013.01)

(58) Field of Classification Search
CPC .......... F01D 25/32; F02B 37/00; F02B 47/08; F05D 2220/40; F05D 2260/602; F05D 2250/51; Y02T 10/12; F04D 29/4213; F04D 29/464; F04D 29/462; F02C 6/12
See application file for complete search history.

(56) References Cited

U.S. PATENT DOCUMENTS

| | | | | |
|---|---|---|---|---|
| 7,204,241 | B2 * | 4/2007 | Thompson | F01M 13/021 123/573 |
| 7,775,759 | B2 * | 8/2010 | Sirakov | F04D 29/685 415/206 |
| 8,272,832 | B2 * | 9/2012 | Yin | F04D 29/685 415/206 |

(Continued)

FOREIGN PATENT DOCUMENTS

| | | |
|---|---|---|
| JP | 2007-255381 A | 10/2007 |
| JP | 2009-236035 A | 10/2009 |

(Continued)

OTHER PUBLICATIONS

International Search Report dated Oct. 13, 2020 in PCT/JP2020/032197, filed on Aug. 26, 2020, 2 pages.

(Continued)

*Primary Examiner* — Jesse S Bogue

(74) *Attorney, Agent, or Firm* — Oblon, McClelland, Maier & Neustadt, L.L.P.

(57) ABSTRACT

A drainage structure includes: a main body including an intake flow path; a compressor impeller disposed in the intake flow path; an accommodation chamber formed in the main body at a position upstream of the compressor impeller in a flow of an intake air; a movable member disposed in the accommodation chamber; and a connecting passage connected to the accommodation chamber.

5 Claims, 9 Drawing Sheets

(56) References Cited

U.S. PATENT DOCUMENTS

| | | | |
|---|---|---|---|
| 8,287,232 B2* | 10/2012 | Gu | F04D 27/0215 |
| | | | 415/57.1 |
| 10,100,788 B2* | 10/2018 | Choi | F02M 26/35 |
| 10,578,048 B2* | 3/2020 | Styles | F04D 29/441 |
| 10,774,677 B2* | 9/2020 | Hu | F04D 27/0253 |
| 11,066,982 B2* | 7/2021 | Tomita | F04D 27/0215 |
| 2016/0131145 A1* | 5/2016 | Mohtar | F02B 37/22 |
| | | | 417/380 |
| 2019/0078587 A1* | 3/2019 | Zeng | F04D 27/002 |
| 2022/0090514 A1* | 3/2022 | Stankevicius | F01D 17/145 |

FOREIGN PATENT DOCUMENTS

| | | |
|---|---|---|
| JP | 2012-102660 A | 5/2012 |
| JP | 2013-163972 A | 8/2013 |
| JP | 2013-170504 A | 9/2013 |
| JP | 5942464 B2 | 6/2016 |
| JP | 2017-115753 A | 6/2017 |
| JP | 2019-85901 A | 6/2019 |
| WO | WO 2015/15251 A1 | 10/2015 |
| WO | WO 2018/092842 A1 | 5/2018 |
| WO | WO 2019/220837 A1 | 11/2019 |

OTHER PUBLICATIONS

Japanese Office Action dated Dec. 6, 2022 in Japanese Patent Application No. 2021-550430, 3 pages.
Decision to Grant dated Feb. 28, 2023 in Japanese Patent Application No. 2021-550430, 3 pages.

* cited by examiner

DRAINAGE STRUCTURE AND TURBOCHARGER

CROSS REFERENCE TO RELATED APPLICATIONS

This application is a continuation application of International Application No. PCT/JP2020/032197, filed on Aug. 26, 2020, which claims priority to Japanese Patent Application No. 2019-185785 filed on Oct. 9, 2019, the entire contents of which are incorporated herein by reference.

BACKGROUND ART

Technical Field

The present disclosure relates to a drainage structure and a turbocharger.

Patent Literature 1 discloses a turbocharger comprising a compressor impeller and a throttling mechanism. The compressor impeller is, for example, driven by a rotation of a turbine impeller. The throttling mechanism changes the cross-sectional area of an intake flow path through which intake air is introduced to the compressor impeller.

CITATION LIST

Patent Literature

Patent Literature 1: JP 2009-236035 A

SUMMARY

Technical Problem

When an engine comprises an exhaust gas recirculation device, a part of exhaust gas from the engine (hereinafter referred to as EGR gas) is supplied to the intake flow path. When the engine is stopped, moisture contained in the intake air in the intake flow path condenses, and condensate is stored in an accommodation chamber where the throttle mechanism is housed. Particularly, condensate is likely to be stored in the accommodation chamber when the EGR gas is supplied to the intake flow path. When a temperature of an environment outside the centrifugal compressor decreases, the condensate stored in the accommodation chamber may freeze. When the condensate in the accommodation chamber freezes, the frozen condensate may inhibit a movement of the throttling mechanism.

An object of the present disclosure is to provide a drainage structure and a turbocharger capable of avoiding freezing of condensate in an accommodation chamber in a centrifugal compressor.

Solution to Problem

In order to solve the above problem, a drainage structure according to one aspect of the present disclosure comprises a main body including an intake flow path; a compressor impeller disposed in the intake flow path; an accommodation chamber formed in the main body at a position upstream of the compressor impeller in a flow of an intake air; a movable member disposed in the accommodation chamber; and a connecting passage connected to the accommodation chamber.

The connecting passage may connect the accommodation chamber with the intake flow path at a position upstream of the accommodation chamber.

The movable member may move in a radial direction of the compressor impeller.

The connecting passage may be formed vertically below the intake flow path in the main body.

In the connecting passage, a position connected to the intake flow path may be vertically below a position connected to the accommodation chamber.

The drainage structure may further comprise a groove formed upstream of the accommodation chamber in the main body and opening to the intake flow path, wherein the connecting passage may connect the accommodation chamber with the groove.

In order to solve the above problem, a turbocharger according to one aspect of the present disclosure comprises one of the above drainage structures.

Effects of Disclosure

According to the present disclosure, it is possible to inhibit freezing of condensate in an accommodation chamber in a centrifugal compressor.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
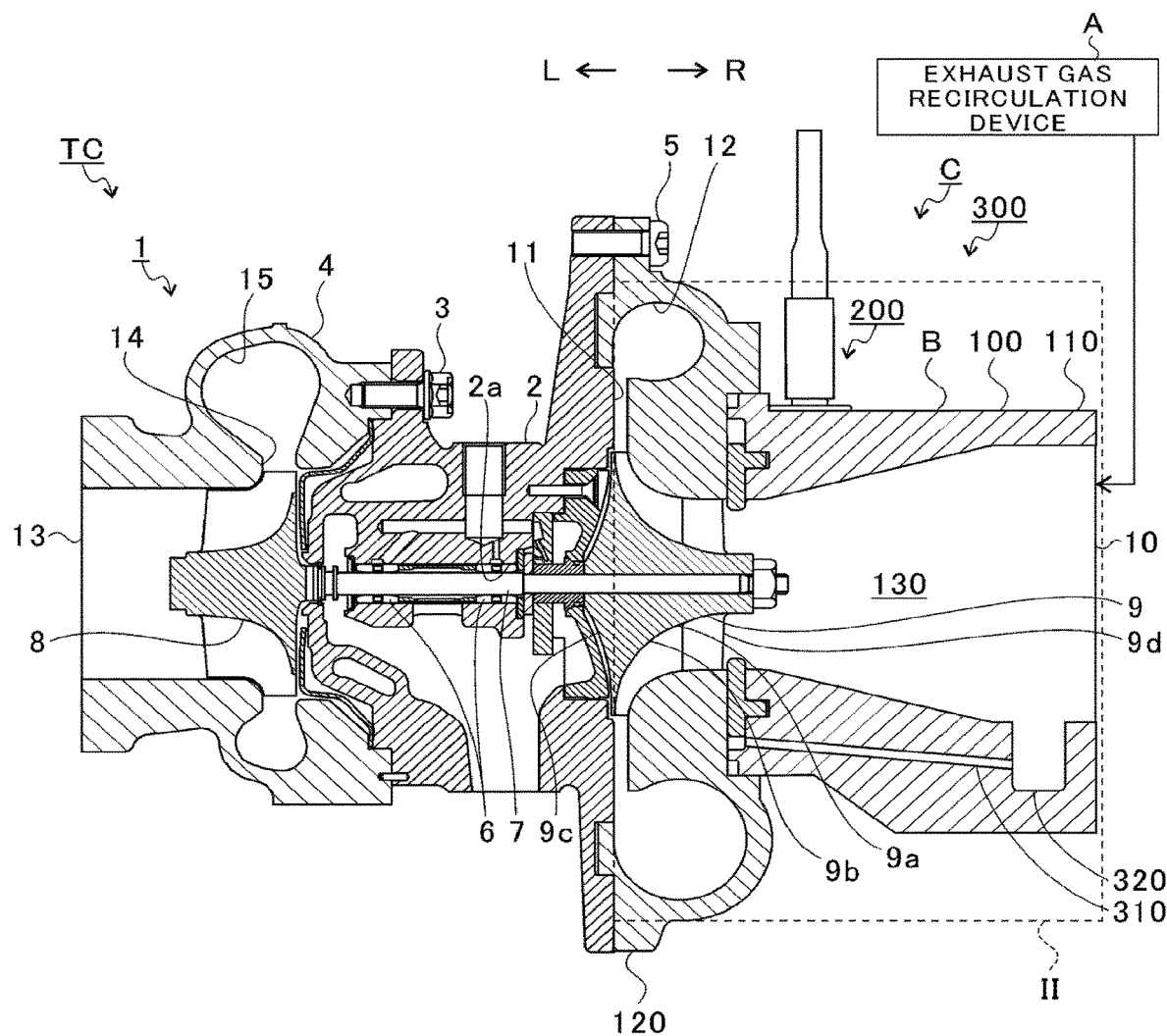
FIG. 1 is a schematic cross-sectional view of a turbocharger.

FIG. 1 is a schematic cross-sectional view of a turbocharger TC. A direction indicated by an arrow L in FIG. 1 is described as a left side of the turbocharger TC. A direction indicated by an arrow R in FIG. 1 is described as a right side of the turbocharger TC. As shown in FIG. 1, the turbocharger TC comprises a turbocharger body 1. The turbocharger body 1 includes a bearing housing 2, a turbine housing 4, a compressor housing 100, a link mechanism 200, and a drainage structure 300. Details of the link mechanism 200 and the drainage structure 300 will be described below. The turbine housing 4 is connected to the left side of the bearing housing 2 by a fastening bolt 3. The compressor housing 100 is connected to the right side of the bearing housing 2 by a fastening bolt 5.

A housing hole 2a is formed in the bearing housing 2. The housing hole 2a passes through in the left-to-right direction of the turbocharger TC. A bearing 6 is arranged in the housing hole 2a. In FIG. 1, a full-floating bearing is shown as an example of the bearing 6. However, the bearing 6 may be any other radial bearing, such as a semi-floating bearing or a rolling bearing. A portion of a shaft 7 is arranged in the housing hole 2a. The shaft 7 is rotatably supported by the bearing 6. A turbine impeller 8 is provided at the left end of the shaft 7. The turbine impeller 8 is rotatably housed in the turbine housing 4. A compressor impeller 9 is provided at the right end of the shaft V. The compressor impeller 9 is rotatably housed in the compressor housing 100.

An inlet 10 is formed in the compressor housing 100. The inlet 10 opens to the right side of the turbocharger TC. The inlet 10 is connected to an air cleaner (not shown). An exhaust gas recirculation device A is connected between the air cleaner and the inlet 10. The exhaust gas recirculation device A supplies a portion of exhaust gas (EGR gas) discharged from an engine (not shown) to the intake flow path between the inlet 10 and the air cleaner. As shown by the solid arrows in FIG. 1, the EGR gas supplied from the exhaust gas recirculation device A is introduced into the inlet 10 of the compressor housing 100.

A diffuser flow path 11 is formed between the bearing housing 2 and the compressor housing 100. The diffuser flow path 11 pressurizes air. The diffuser flow path 11 is formed in an annular shape from an inner side to an outer side in a radial direction of the shaft 7 (compressor impeller 9) (hereinafter simply referred to as the radial direction). The diffuser flow path 11 is connected to the inlet 10 via the compressor impeller 9 in the inner side of the radial direction.

A compressor scroll flow path 12 is formed in the compressor housing 100. The compressor scroll flow path 12 is formed in an annular shape. The compressor scroll flow path 12 is, for example, positioned radially outside the compressor impeller 9. The compressor scroll flow path 12 is connected to an air intake of the engine (not shown) and to the diffuser flow path 11. When the compressor impeller 9 rotates, air is sucked into the compressor housing 100 from the inlet 10. The intake air is pressurized and accelerated when passing through the blades of the compressor impeller 9. The pressurized and accelerated air is further pressurized in the diffuser flow path 11 and the compressor scroll flow path 12. The pressurized air is discharged from a discharge port (not shown) and is led to the air intake of the engine.

As described above, the turbocharger TC comprises a centrifugal compressor C (compressor). The centrifugal compressor C includes the compressor housing 100, the compressor impeller 9, the compressor scroll flow path 12, and the link mechanism 200 and the drainage structure 300 which will be described below.

An outlet 13 is formed in the turbine housing 4. The outlet 13 opens to the left side of the turbocharger TC. The outlet 13 is connected to an exhaust gas purification device (not shown). A connecting flow path 14 and a turbine scroll flow path 15 are formed in the turbine housing 4. The turbine scroll flow path 15 is positioned radially outside the turbine impeller 8. The connecting flow path 14 is positioned between the turbine impeller 8 and the turbine scroll flow path 15.

The turbine scroll flow path 15 is connected to a gas intake (not shown). Exhaust gas discharged from an exhaust manifold (not shown) of the engine is led to the gas intake. The connecting flow path 14 connects the turbine scroll flow path 15 with the outlet 13 via the turbine impeller 8. The exhaust gas led from the gas intake to the turbine scroll flow path 15 is led to the outlet 13 through the connecting flow path 14 and between the blades of the turbine impeller 8. The exhaust gas led to the outlet 13 rotates the turbine impeller 8 when passing therethrough.

The rotational force of the turbine impeller 8 is transmitted to the compressor impeller 9 via the shaft 7. As described above, the air is pressurized by the rotational force of the compressor impeller 9 and is led to the air intake of the engine.

Figure 2:
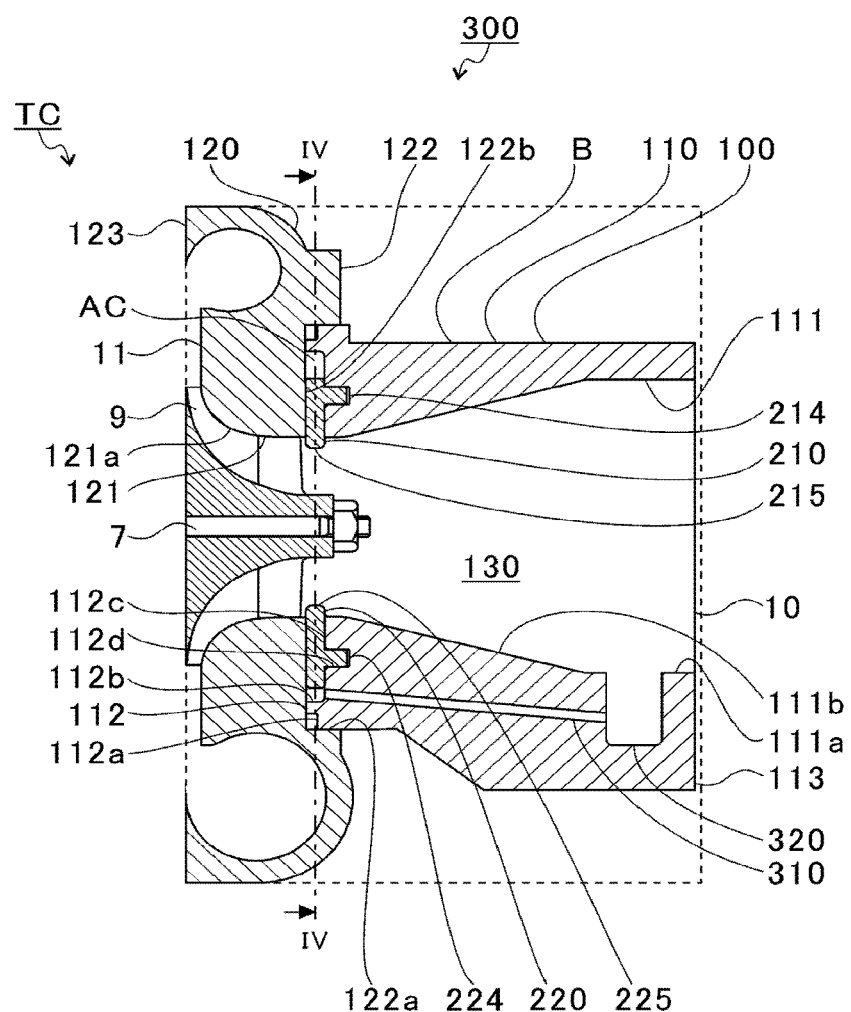
FIG. 2 shows an extraction of a dashed area in FIG. 1.

FIG. 2 is an extraction of a dashed area in FIG. 1. As shown in FIG. 2, the compressor housing 100 comprises a main body B. The main body B includes a first housing member 110 and a second housing member 120. The first housing member 110 is positioned in the right side of the second housing member 120 in FIG. 2 (a side spaced apart from the bearing housing 2). The second housing member 120 is connected to the bearing housing 2. The first housing member 110 is connected to the second housing member 120.

The first housing member 110 has an approximately cylindrical shape. A through hole 111 is formed in the first housing member 110. The first housing member 110 has an end surface 112 on a side that is proximate (connected) to the second housing member 120. The first housing member 110 has an end surface 113 on a side that is spaced apart from the second housing member 120. The inlet 10 is formed on the end surface 113. The through hole 111 extends from the end surface 112 to the end surface 113 along the rotational axis direction of the shaft 7 (compressor impeller 9) (hereinafter simply referred to as the rotational axis direction). In other words, the through hole 111 penetrates the first housing member 110 in the rotational axis direction. The through hole 111 includes the inlet 10 at the end surface 113.

The through hole 111 has a parallel portion 111a and a tapered portion 111b. The parallel portion 111a is positioned closer to the end surface 113 with respect to the tapered portion 111b. An inner diameter of the parallel portion 111a is substantially constant over the rotational axis direction. The tapered portion 111b is positioned closer to the end surface 112 with respect to the parallel portion 111a. The tapered portion 111b is continuous with the parallel portion 111a. In the tapered portion 111b, an inner diameter of a portion that is continuous with the parallel portion 111a is substantially equal to the inner diameter of the parallel portion 111a. The inner diameter of the tapered portion 111b decreases as being spaced apart from the parallel portion 111a (as approaching the end surface 112).

A notch portion 112a is formed on the end surface 112. The notch portion 112a is depressed from the end surface 112 toward the end surface 113. The notch 112a is formed on an outer periphery of the end surface 112. The notch portion 112a has, for example, a substantially annular shape when seen from the rotational axis direction.

An accommodation chamber AC is formed on the end surface 112. In the main body B, the accommodation chamber AC is formed upstream of the blades of the compressor impeller 9 in the flow of the intake air. For example, the accommodation chamber AC is arranged upstream of the leading edge of the blades of the compressor impeller 9 in the flow of the intake air. The accommodation chamber AC includes an accommodation groove 112b, bearing holes 112d, and an accommodation hole 115 which will be described below.

The accommodation groove 112b is formed in the end surface 112. The accommodation groove 112b is located between the notch portion 112a and the through hole 111. The accommodation groove 112b is depressed from the end surface 112 toward the end surface 113. The accommodation groove 112b has, for example, a substantially annular shape when seen from the rotational axis direction. The accommodation groove 112b is connected to the through hole 111 at a radially inner part.

The bearing holes 112d are formed in a wall surface 112c on the end surface 113 side of the accommodation groove 112b. The bearing holes 112d extend in the rotational axis direction from the wall surface 112c toward the end surface 113. Two bearing holes 112d are provided with being spaced apart from each other in a rotational direction of the shaft 7 (compressor impeller 9) (hereinafter simply referred to as the rotational direction or a circumferential direction). The two bearing holes 112d are arranged at positions spaced apart from each other by 180 degrees in the rotational direction.

A through hole 121 is formed in the second housing member 120. The second housing member 120 has an end surface 122 on a side proximate (connected) to the first housing member 110. The second housing member 120 has an end surface 123 on a side spaced apart from the first housing member 110 (a side connected to the bearing housing 2). The through hole 121 extends from the end surface 122 to the end surface 123 along the rotational axis direction. In other words, the through hole 121 penetrates the second housing member 120 in the rotational axis direction.

An inner diameter of the through hole 121 at an end portion on the end surface 122 is substantially equal to the inner diameter of the through hole 111 at an end portion on the end surface 112. A shroud portion 121a is formed on an inner wall of the through hole 121. The shroud portion 121a faces the compressor impeller 9 from radially outside. An inner diameter of the shroud portion 121a increases as approaching the end surface 123. An end portion of the shroud portion 121a on the end surface 123 communicates with the diffuser flow path 11.

An accommodation groove 122a is formed on the end surface 122. The accommodation groove 122a is depressed from the end surface 122 toward the end surface 123. The accommodation groove 122a has, for example, a substantially annular shape when seen from the rotational axis direction. The housing member 110 is inserted into the accommodation groove 122a. The end surface 112 of the first housing member 110 contacts a wall 122b on an end surface 123 side of the accommodation groove 122a. In this state, an accommodation chamber AC is formed between the first housing member 110 (wall surface 112c) and the second housing member 120 (wall surface 122b).

The through hole 111 of the first housing member 110 and the through hole 121 of the second housing member 120 form an intake flow path 130. As such, the intake flow path 130 is formed in the main body B. The intake flow path 130 is connected from the air cleaner (not shown) to the diffuser flow path 11 through the inlet 10. An air cleaner side of the intake flow path 130 is referred to as an upstream side of the intake air (hereinafter simply referred to as the upstream side), and a diffuser flow path 11 side of the intake flow path 130 is referred to as a downstream side of the intake air (hereinafter simply referred to as the downstream side). The compressor impeller 9 is arranged in the intake flow path 130. A cross-sectional shape of the intake flow path 130 (through holes 111 and 121) perpendicular to the rotational axis direction has, for example, a circular shape centered on the rotational axis of the compressor impeller 9. However, the cross-sectional shape of the intake flow path 130 is not limited thereto, and may be, for example, an elliptical shape.

A sealing member (not shown) is disposed in the notch portion 112a of the first housing member 110. The sealing member reduces an air flow through a gap between the first housing member 110 and the second housing member 120. However, the notch portion 112a and the sealing member are not essential.

Figure 3:
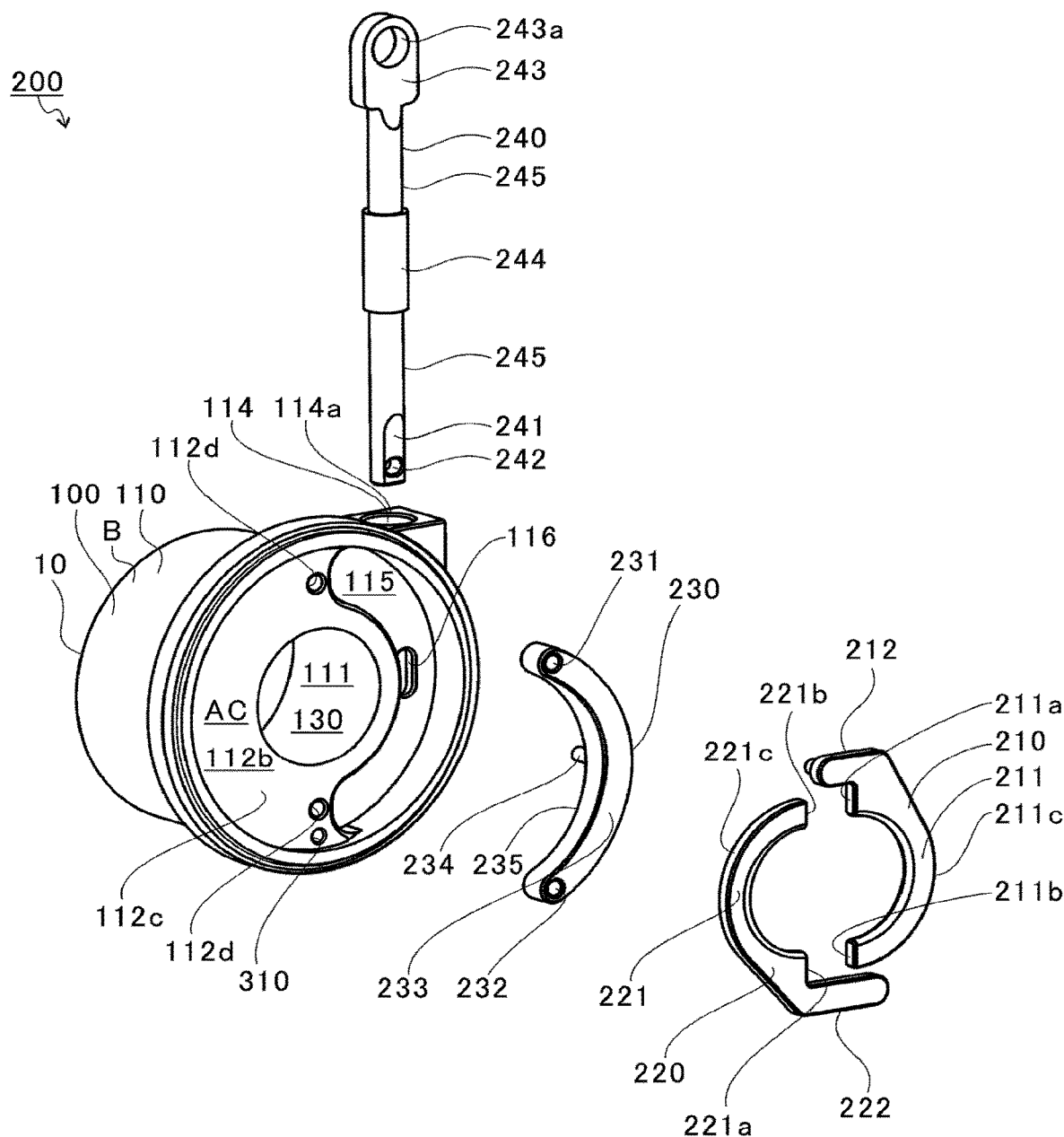
FIG. 3 is an exploded view of components of a link mechanism.

FIG. 3 is an exploded view of components of the link mechanism 200. In FIG. 3, only the first housing member 110 of the main body B is shown. As shown in FIG. 3, the link mechanism 200 includes the main body B, a first movable member 210, a second movable member 220, a connecting member 230, and a rod 240. In the intake flow path 130, the link mechanism 200 is arranged closer to the inlet 10 (the upstream side) with respect to the compressor impeller 9 in the rotational axis direction.

The first movable member 210 is disposed in the accommodation groove 112b (accommodation chamber AC). Specifically, the first movable member 210 is disposed between the wall surface 112c of the accommodation groove 112b and the wall surface 122b of the accommodation groove 122a (see FIG. 2) in the rotational axis direction. The first movable member 210 includes a curved portion 211 and an arm portion 212.

The curved portion 211 has a substantially semicircular arc shape. In the curved portion 211, one end surface 211a and the other end surface 211b in the rotational direction extend parallel to the radial direction and the rotational axis direction. However, the one end surface 211a and the other end surface 211b may be inclined with respect to the radial direction and the rotational axis direction.

The arm portion 212 is provided on a side of the one end surface 211a in the curved portion 211. The arm portion 212 extends radially outward from an outer peripheral surface 211c of the curved portion 211. The arm portion 212 extends in a direction that is inclined with respect to the radial direction (toward the second movable member 220).

The second movable member 220 is disposed in the accommodation groove 112b (accommodation chamber AC). Specifically, the second movable member 220 is disposed between the wall surface 112c of the accommodation groove 112b and the wall surface 122b of the accommodation groove 122a (see FIG. 2) in the rotational axis direction. The second movable member 220 includes a curved portion 221 and an arm portion 222.

The curved portion 221 has a substantially semicircular arc shape. In the curved portion 221, one end surface 221a and the other end surface 221b in the rotational direction extend parallel to the radial direction and the rotational axis direction. However, the one end surface 221a and the other end surface 221b may be inclined with respect to the radial direction and the rotational axis direction.

The arm portion 222 is provided on a side of the one end surface 221a in the curved portion 221. The arm portion 222 extends radially outward from an outer peripheral surface 221c of the curved portion 221. The arm portion 222 extends in a direction inclined with respect to the radial direction (toward the first movable member 210).

The curved portion 211 faces the curved portion 221 across a center of rotation (intake flow path 130) of the compressor impeller 9. The one end surface 211a of the curved portion 211 faces the other end surface 221b of the curved portion 221 in the circumferential direction. The other end surface 211b of the curved portion 211 faces the one end surface 221a of the curved portion 221 in the circumferential direction.

The connecting member 230 is connected to the first movable member 210 and the second movable member 220. The connecting member 230 is positioned closer to the inlet 10 with respect to the first movable member 210 and the second movable member 220. The connecting member 230 has a substantially circular arc-shaped. The connecting member 230 includes a first bearing hole 231 formed at one end side in the circumferential direction of the compressor impeller 9 and a second bearing hole 232 formed at the other end side. In the connecting member 230, the first bearing hole 231 and the second bearing hole 232 are opened on an end surface 233 closer to the first movable member 210 and the second movable member 220. The first bearing hole 231 and the second bearing hole 232 extend in the rotational axis direction. In this embodiment, the first bearing hole 231 and the second bearing hole 232 are non-through holes. However, the first bearing hole 231 and the second bearing hole 232 may penetrate the connecting member 230 in the rotational axis direction.

In the connecting member 230, a rod connection portion 234 is formed between the first bearing hole 231 and the second bearing hole 232. In the connecting member 230, the rod connection portion 234 is formed on an end surface 235 opposite to the first movable member 210 and the second movable member 220. The rod connection portion 234 protrudes from the end surface 235 in the rotational axis direction. The rod connection portion 234 has, for example, a substantially cylindrical shape.

The rod 240 has a substantially cylindrical shape. The rod 240 includes a flat portion 241 formed at one end and a connecting portion 243 formed at the other end. The flat portion 241 extends in a plane direction substantially perpendicular to the rotational axis direction. A bearing hole 242 is opened on the flat portion 241. The bearing hole 242 extends in the rotational axis direction. The connecting portion 243 includes a connecting hole 243a. An actuator (described below) is connected to the connecting portion 243 (the connecting hole 243a). The bearing hole 242 may be, for example, an elongated hole whose length in a direction perpendicular to the rotational axis direction and an axis direction of the rod 240 (left-to-right direction in FIG. 5 which will be described below) is longer than a length in the axis direction of the rod 240.

The rod 240 includes a rod large diameter portion 244 and two rod small diameter portions 245 between the flat portion 241 and the connecting portion 243. The rod large diameter portion 244 is positioned between the two rod smaller diameters 245. Between the two rod small diameter portions 245, the rod small diameter portion 245 closer to the flat portion 241 connects the rod large diameter portion 244 with the flat portion 241. Between the two rod smaller diameters 245, the rod small diameter portion 245 closer to the connecting portion 243 connects the rod large diameter portion 244 with the connecting portion 243. An outer diameter of the rod large diameter portion 244 is larger than an outer diameter of the two rod small diameter portions 245.

An insertion hole 114 is formed in the first housing member 110. One end 114a of the insertion hole 114 opens to the outside of the first housing member 110. The insertion hole 114 extends, for example, in a plane direction perpendicular to the rotational axis direction. The insertion hole 114 is positioned radially outside the through hole 111 (intake flow path 130). A side including the flat portion 241 in the rod 240 is inserted into the insertion hole 114. The rod large diameter portion 244 is guided by an inner wall surface of the insertion hole 114. The rod 240 is restricted from moving in a direction other than the central axis direction of the insertion hole 114 (the central axis direction of the rod 240).

An accommodation hole 115 is formed in the first housing member 110. The accommodation hole 115 is opened on the wall surface 112c of the accommodation groove 112b. The accommodation hole 115 is recessed from the wall surface 112c toward the inlet 10. The accommodation hole 115 is positioned spaced apart from the inlet 110 (closer to the second housing member 120) with respect to the insertion hole 114. The accommodation hole 115 has a substantially arc shape when seen from the rotational axis direction. The accommodation hole 115 extends longer than the connecting member 230 in the circumferential direction. The accommodation hole 115 is spaced apart from the bearing holes 112d in the rotational direction.

A connecting hole 116 is formed in the first housing member 110. The connecting hole 116 connects the insertion hole 114 with the accommodation hole 115. The connecting hole 116 is formed at a substantially middle portion in the circumferential direction in the accommodation hole 115. The connecting hole 116 is, for example, an elongated hole extending substantially parallel to the extending direction of the insertion hole 114. The connecting hole 116 has a width in the longitudinal direction (extending direction) that is greater than a width in the lateral direction (perpendicular to the extending direction). The width in the lateral direction of the connecting hole 114 is greater than the outer diameter of the rod connection portion 234 of the connecting member 230.

The connecting member 230 is accommodated in the accommodation hole 115 (the accommodation chamber AC). Thus, the first movable member 210, the second movable member 220, and the connecting member 230 are disposed in the accommodation chamber AC formed in the main body B. The accommodation hole 115 has a longer circumferential length and a larger radial width than those of the connecting member 230. Therefore, the connecting member 230 is allowed to move inside the accommodation hole 115 in the plane direction perpendicular to the rotational axis direction.

The rod connection portion 234 is inserted from the connecting hole 116 into the insertion hole 114. The flat portion 241 of the rod 240 is inserted into the insertion hole 114. The bearing hole 242 of the flat portion 241 faces the connecting hole 116. The rod connection portion 234 is inserted into (connected to) the bearing hole 242. The rod connection portion 234 is supported by the bearing hole 242.

Figure 4:
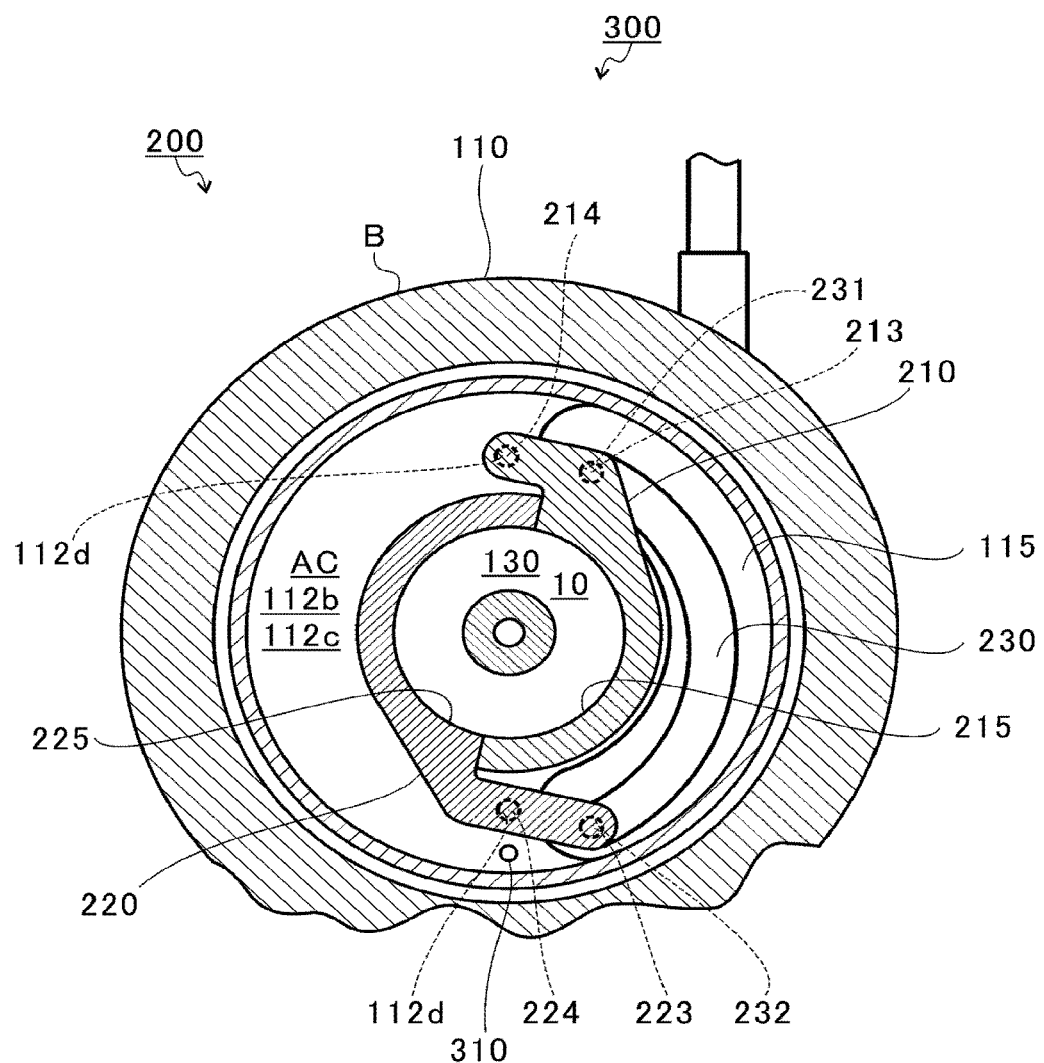
FIG. 4 is a cross-sectional view taken along IV-IV line in FIG. 2.

FIG. 4 is a cross-sectional view taken along line IV-IV in FIG. 2. As shown by dashed lines in FIG. 4, the first movable member 210 has a connecting shaft portion 213 and a rotational shaft portion 214. In the first movable member 210, the connecting shaft portion 213 and the rotational shaft portion 214 protrude in the rotational axis direction from the end surface closer to the inlet 10 (closer to the wall surface 112c of the accommodation groove 112b). The connecting shaft portion 213 and the rotational shaft portion 214 extend to the back side of the paper in FIG. 4. The rotational shaft portion 214 extends parallel to the connecting shaft portion 213. The connecting shaft portion 213 and the rotational shaft portion 214 have a substantially cylindrical shape.

The outer diameter of the connecting shaft portion 213 is smaller than the inner diameter of the first bearing hole 231 of the connecting member 230. The connecting shaft portion 213 is inserted into the first bearing hole 231. The connecting shaft portion 213 is supported by the first bearing hole 231. The outer diameter of the rotational shaft portion 214 is smaller than the inner diameter of the bearing hole 112d of the first housing member 110. Between the two bearing holes 112d, the rotational shaft portion 214 is inserted into the bearing hole 112d on the vertically upper side (proximate to the rod 240). The rotational shaft portion 214 is supported by the bearing holes 112d (see FIG. 2). In other words, the rotational shaft portion 214 connects the first movable member 210 with the wall surface 112c facing the first movable member 210 in the rotational axis direction.

The second movable member 220 has a connecting shaft portion 223 and a rotational shaft portion 224. In the second movable member 220, the connecting shaft portion 223 and the rotational shaft portion 224 protrude in the rotational axis direction from an end surface closer to the inlet 10 (closer to the wall surface 112c of the accommodation groove 112b). The connecting shaft portion 223 and the rotational shaft portion 224 extend to the back side of the paper in FIG. 4. The rotational shaft portion 224 extends parallel to the connecting shaft portion 223. The connecting shaft portion 223 and the rotational shaft portion 224 have a substantially cylindrical shape.

The outer diameter of the connecting shaft portion 223 is smaller than the inner diameter of the second bearing hole 232 of the connecting member 230. The connecting shaft portion 223 is inserted into the second bearing bore 232. The connecting shaft portion 223 is supported by the second bearing hole 232. The outer diameter of the rotational shaft portion 224 is smaller than the inner diameter of the bearing hole 112d of the first housing member 110. Between the two bearing holes 112d, the rotational shaft portion 224 is inserted into the bearing hole 112d on the vertically lower side (spaced apart from the rod 240). The rotational shaft portion 224 is supported by the bearing hole 112d (see FIG. 2). In other words, the rotational shaft portion 224 connects the second movable member 220 with the wall surface 112c facing the second movable member 220 in the rotational axis direction.

Accordingly, the link mechanism 200 includes a four-bar linkage. The four links (nodes) are the first movable member 210, the second movable member 220, the first housing member 110, and the connecting member 230. Since the link mechanism 200 includes the four-bar linkage, it is a limited chain and has one degree of freedom, making it easy to control.

Figure 5:
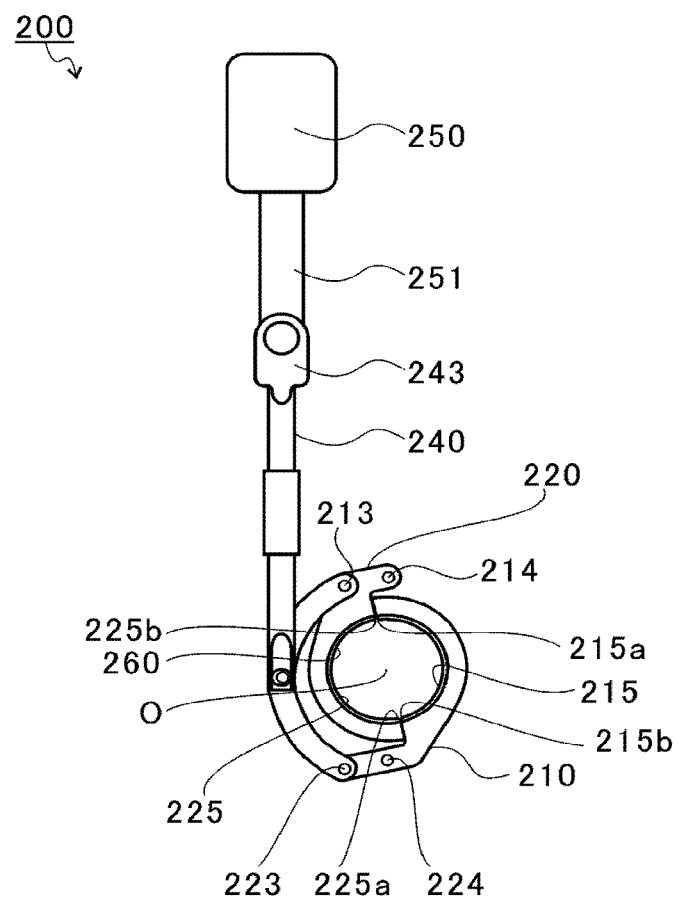
FIG. 5 is a first illustration of an operation of the link mechanism (throttling mechanism).

FIG. 5 is a first illustration of an operation of the link mechanism 200. In the following FIGS. 5, 6 and 7, a view of the link mechanism 200 is seen from the inlet 10. As shown in FIG. 5, one end of a drive shaft 251 of an actuator 250 is connected to the connecting portion 243 of the rod 240.

In the arrangement shown in FIG. 5, the first movable member 210 and the second movable member 220 are in contact with each other. In this state, as shown in FIGS. 2 and 4, a protruding portion 215 that is an inner portion in the radial direction of the first movable member 210 protrudes into the intake flow path 130. A protruding portion 225 that is an inner portion in the radial direction of the second movable member 220 protrudes into the intake flow path 130. The positions of the first movable member 210 and the second movable member 220 in this state are referred to as a throttle position.

Thus, in the present embodiment, the first movable member 210 and the second movable member 220 are configured as a throttling member that throttles the intake flow path 130. The first movable member 210 and the second movable member 220 can change a cross-sectional area of the intake flow path 130 by operating the link mechanism 200 by the actuator 250.

In the present embodiment, the first movable member 210 and the second movable member 220 move in the radial direction of the compressor impeller 9. The first movable member 210 and the second movable member 220 move to the throttle position where they protrude into the intake flow path 130 and to a retracted position where they do not protrude into the intake flow path 130. Since the first movable member 210 and the second movable member 220 do not protrude into the intake flow path 130 when they are in the retracted position, the pressure loss of the intake air (air) flowing through the intake flow path 130 can be reduced.

In this way, the first movable member 210 and the second movable member 220 can reduce the pressure loss of the intake air (air) flowing through the intake flow path 130 compared to the case where the first movable member 210 and the second movable member 220 do not move from the throttle position (protruding position) to the retracted position. However, the first movable member 210 and the second movable member 220 are not limited thereto, and may not move in the radial direction of the compressor impeller 9. For example, the first movable member 210 and the second movable member 220 may rotate around an axis orthogonal to the rotational axis of the compressor impeller 9. For example, the first movable member 210 and the second movable member 220 may be inlet guide vanes. The first movable member 210 and the second movable member 220 may also rotate around the rotational axis of the compressor impeller 9. For example, the first movable member 210 and the second movable member 220 may be shutter vanes having two or more vanes.

As shown in FIG. 5, in the throttle position, the end portions 215a and 215b in the rotational direction of the protruding portion 215 and the end portions 225a and 225b in the rotational direction of the protruding portion 225 contact with each other. An annular hole 260 is formed by the protruding portion 215 and the protruding portion 225. An inner diameter of the annular hole 260 is smaller than an inner diameter of the intake flow path 130 at a position where the protruding portions 215 and 225 protrude. The inner diameter of the annular hole 260 is, for example, smaller than the inner diameter of the intake flow path 130 at any positions.

Figure 6:
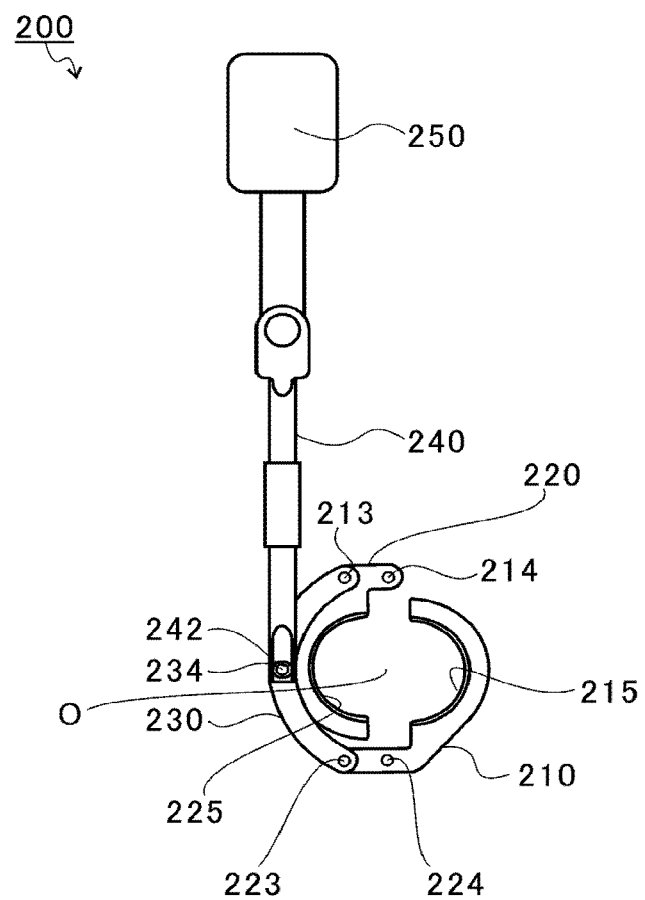
FIG. 6 is a second illustration of the operation of the link mechanism.
Figure 7:
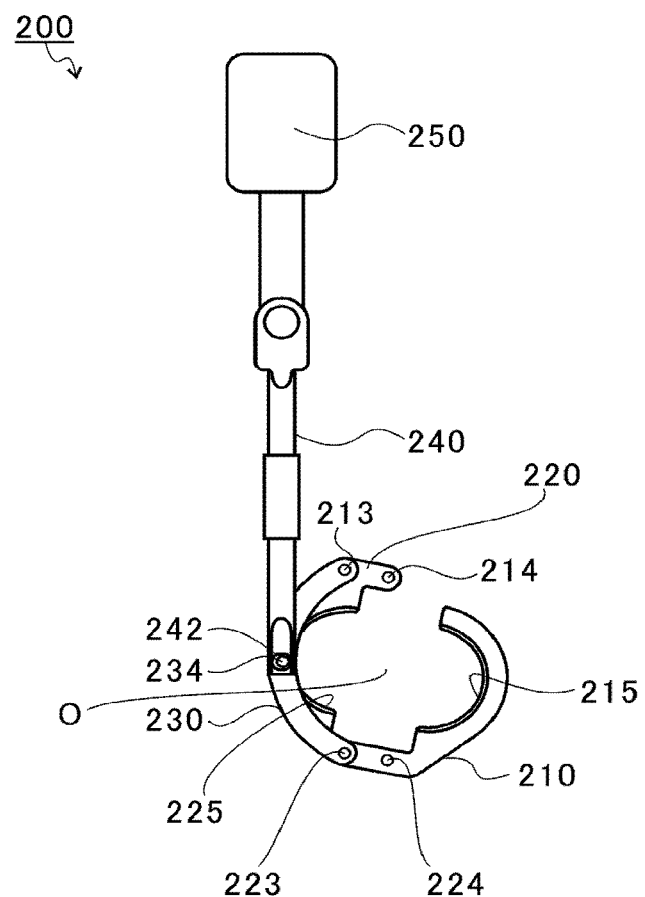
FIG. 7 is a third illustration of the operation of the link mechanism.

FIG. 6 is a second illustration of the operation of the link mechanism 200. FIG. 7 is a third illustration of the operation of the link mechanism 200. The actuator 250 linearly moves the rod 240 in a direction intersecting the rotational axis direction (up-and-down direction in FIGS. 6 and 7). The rod 240 moves upward from the state shown in FIG. 5. The amount of movement of the rod 240 relative to the arrangement shown in FIG. 5 is greater in the arrangement shown in FIG. 7 than in the arrangement shown in FIG. 6.

When the rod 240 moves, the connecting member 230 is moved upward in FIGS. 6 and 7 through the rod connecting portion 234. In these states, the connecting member 230 is allowed to rotate around the rod connecting portion 234 as the center of rotation. There is a slight play in the inner diameter of the bearing hole 242 of the rod 240 relative to the outer diameter of the rod connecting portion 234. Therefore, the connecting member 230 is slightly allowed to move in a plane direction perpendicular to the rotational axis direction.

As described above, the link mechanism 200 is a four-bar linkage. The connecting member 230, the first movable member 210, and the second movable member 220 exhibit a behavior of one degree of freedom with respect to the first housing member 110. Specifically, the connecting member 230 slightly moves in the left-to-right direction while slightly rotating in the counterclockwise direction in FIGS. 6 and 7 within the above allowable range.

In the first movable member 210, the rotational shaft portion 214 is supported by the first housing member 110. The rotational shaft portion 214 is restricted from moving in a plane direction perpendicular to the rotational axis direction. The connecting shaft portion 213 is supported by the connecting member 230. Since the connecting member 230 is allowed to move, the connecting shaft portion 213 is movable in the plane direction perpendicular to the rotational axis direction. As a result, with the movement of the connecting member 230, the first movable member 210 rotates in a clockwise direction in FIGS. 6 and 7 around the rotational shaft portion 214 as a rotation center.

Similarly, in the second movable member 220, the rotational shaft portion 224 is supported by the first housing member 110. The rotational shaft portion 224 is restricted from moving in the plane direction perpendicular to the rotational axis direction. The connecting shaft portion 223 is supported by the connecting member 230. Since the connecting member 230 is allowed to move, the connecting shaft portion 223 is movable in the plane direction perpendicular to the rotational axis direction. As a result, with the movement of the connecting member 230, the second movable member 220 rotates in a clockwise direction in FIGS. 6 and 7 around the rotational shaft portion 224 as a rotation center.

Thus, the first movable member 210 and the second movable member 220 move in directions separating from each other in the order of FIGS. 6 and 7. The protruding portions 215 and 225 move radially outward from the throttle position (to the retracted position). In the retracted position, for example, the protruding portions 215 and 225 are flush with the inner wall surface of the intake flow path 130 or are located radially outside the inner wall surface of the intake flow path 130. When moving from the retracted position to the throttle position, the first movable member 210 and the second movable member 220 approach to and contact with each other in the order of FIGS. 7, 6 and 5. Thus, the first movable member 210 and the second movable member 220 switch between the throttle position and the retracted position according to the rotation angle around the rotational shaft portions 214 and 224 as the rotation centers.

In this manner, the first movable member 210 and the second movable member 220 can move between the throttle position and the retracted position. According to the link mechanism 200, the structure for changing the flow path cross-sectional area (effective cross-sectional area) of the intake flow path 130 can be simplified.

When EGR gas is supplied to the intake flow path 130 and the engine is stopped, moisture contained in the EGR gas condenses and condensate is stored in the accommodation chamber AC. When the temperature of the environment outside the centrifugal compressor C (turbocharger TC) decreases, the condensate stored in the accommodation chamber AC may freeze. When the condensate in the accommodation chamber AC freezes, the frozen condensate may inhibit the movement of the first movable member 210, the second movable member 220, and a part of the link mechanism 200 (e.g., the connecting member 230) in the accommodation chamber AC.

Therefore, as shown in FIG. 2, the centrifugal compressor C of this embodiment comprises a drainage structure 300. The drainage structure 300 includes the main body B, the compressor impeller 9, the accommodation chamber AC, the first movable member 210, the second movable member 220, the connecting member 230 (see FIG. 3), and a connecting passage 310 and a groove 320.

As shown in FIG. 2, the connecting passage 310 is formed in the main body B (the first housing member 110) and connected to the accommodation chamber AC. The connection of the connecting passage 310 with the accommodation chamber AC allows condensate in the accommodation chamber AC to be discharged outside the accommodation chamber AC.

The groove 320 is formed upstream of the accommodation chamber AC in the flow of the intake air in the main body B, and opens to the intake flow path 130. The groove 320 is opened on the parallel portion 111a of the through hole 111. However, the groove 320 may be opened on the tapered portion 111b of the through hole 111. The groove 320 is formed vertically below the axis center of the shaft 7.

The connecting passage 310 is disposed between the accommodation chamber AC and the groove 320. One end of the connecting passage 310 is connected to the accommodation chamber AC, and the other end is connected to the groove 320. The connecting passage 310 connects the accommodation chamber AC with the groove 320.

The connecting passage 310 is formed vertically below the intake flow path 130 in the main body B. As shown in FIGS. 3 and 4, the connecting passage 310 is in communication with the accommodation chamber AC at a position vertically below the intake flow path 130.

The connecting passage 310 is in communication with the accommodation chamber AC at a position that is vertically below the lowermost position in the vertical direction among the movable ranges of the first movable member 210, the second movable member 220 and the connecting member 230. The condensate is stored vertically a lower part in the accommodation chamber AC. Therefore, it is preferable that the connecting passage 310 is connected to the vertically lowermost position of the accommodation chamber AC.

The connecting passage 310 can make it easier to discharge the condensate stored in the accommodation chamber AC compared to the case where the connecting passage 310 is formed vertically above the intake flow path 130. In other words, the connecting passage 310 can make it easier to discharge the condensate stored in the accommodation chamber AC compared to the case where the connecting passage 310 is in communication with the accommodation chamber AC at a position vertically above the intake flow path 130.

As shown in FIG. 2, in the cross section including the axis center of the shaft 7, the connecting passage 310 is inclined vertically downward as being spaced apart from the accommodation chamber AC. In the connecting passage 310, the position connected to the groove 320 (or the intake flow path 130) is vertically lower than the position connected to the accommodation chamber AC. The connecting passage 310 is in communication with the groove 320 at a position vertically above the bottom surface thereof. However, the connecting passage 310 may be in communication with the bottom surface of the groove 320.

This makes it easier for the condensate in the accommodation chamber AC to move from one end of the connecting passage 310 where the connecting passage 310 is in communication with the accommodation chamber AC to the other end. In other words, the connecting passage 310 can make it easier to discharge the condensate in the accommodation chamber AC to the outside of the accommodation chamber AC.

The condensate stored in the accommodation chamber AC is discharged into the groove 320 through the connecting passage 310. The condensate discharged into the groove 320 is stored in the groove 320. Therefore, even if the temperature of the environment outside the centrifugal compressor C decreases and the condensate freezes, the frozen condensate is retained in the groove 320.

Therefore, the condensate is difficult to be frozen in the accommodation chamber AC and in the intake flow path 130. If the condensate freezes in the intake flow path 130, the frozen condensate (ice block) may flow in the intake flow path 130 and contact the compressor impeller 9 when the centrifugal compressor C is in operation, thereby reducing the durability of the compressor impeller 9. In the present embodiment, it is possible to inhibit the condensate from freezing in the intake flow path 130 by forming the groove 320 in the main body B. In addition, an opening of the groove 320 to the intake flow path 130 can facilitate evaporation of the frozen condensate due to a temperature increase after the centrifugal compressor C starts the operation.

However, the present disclosure is not limited thereto, and the groove 320 may not be formed in the main body B. In such a case, the connecting passage 310 may be connected to the accommodation chamber AC only.

One end of the connecting passage 310 may be connected to the accommodation chamber AC, and the other end may open (connect) to the intake flow path 130 at a position upstream of the accommodation chamber AC in the flow of the intake air. In other words, the connecting passage 310 connects the accommodation chamber AC with the intake flow path 130. Since the connecting passage 310 connects the accommodation chamber AC with the intake flow path 130, the connecting passage 310 can make it easier to discharge condensate from the accommodation chamber AC, compared to the case where the connecting passage 310 is not connected to the intake flow path 130 and is connected only to the accommodation chamber AC.

In the present embodiment, the connecting passage 310 is not connected to the compressor scroll flow path 12. In other words, the connecting passage 310 does not connect the accommodation chamber AC with the compressor scroll flow path 12. When the connecting passage 310 is connected with the compressor scroll flow path 12, the pressurized air circulating in the compressor scroll flow path 12 is returned to the intake flow path 130 at a position upstream of the compressor impeller 9 via the accommodation chamber AC.

If the air pressurized by the compressor impeller 9, the diffuser flow path 11 and the compressor scroll flow path 12 is returned to the intake flow path 130 at a position upstream of the compressor impeller 9, the efficiency of the centrifugal compressor C is reduced. In addition, since the pressurized air flows into the accommodation chamber AC through the connecting passage 310, it becomes difficult for condensate to be discharged outside the accommodation chamber AC.

Therefore, the connecting passage 310 of this embodiment does not connect the accommodation chamber AC with a space having a pressure greater than the pressure in the accommodation chamber AC (e.g., the compressor scroll flow path 12). The connecting passage 310 of this embodiment connects the accommodation chamber AC with a space having a pressure less than the pressure in the accommodation chamber AC (e.g., a closed space, the intake flow path 130, the groove 320, etc.).

As described above, the drainage structure 300 of the present embodiment comprises a connecting passage 310 connected to the accommodation chamber AC. As a result, freezing of the condensate in the accommodation chamber AC in the centrifugal compressor C can be inhibited.

Figure 8:
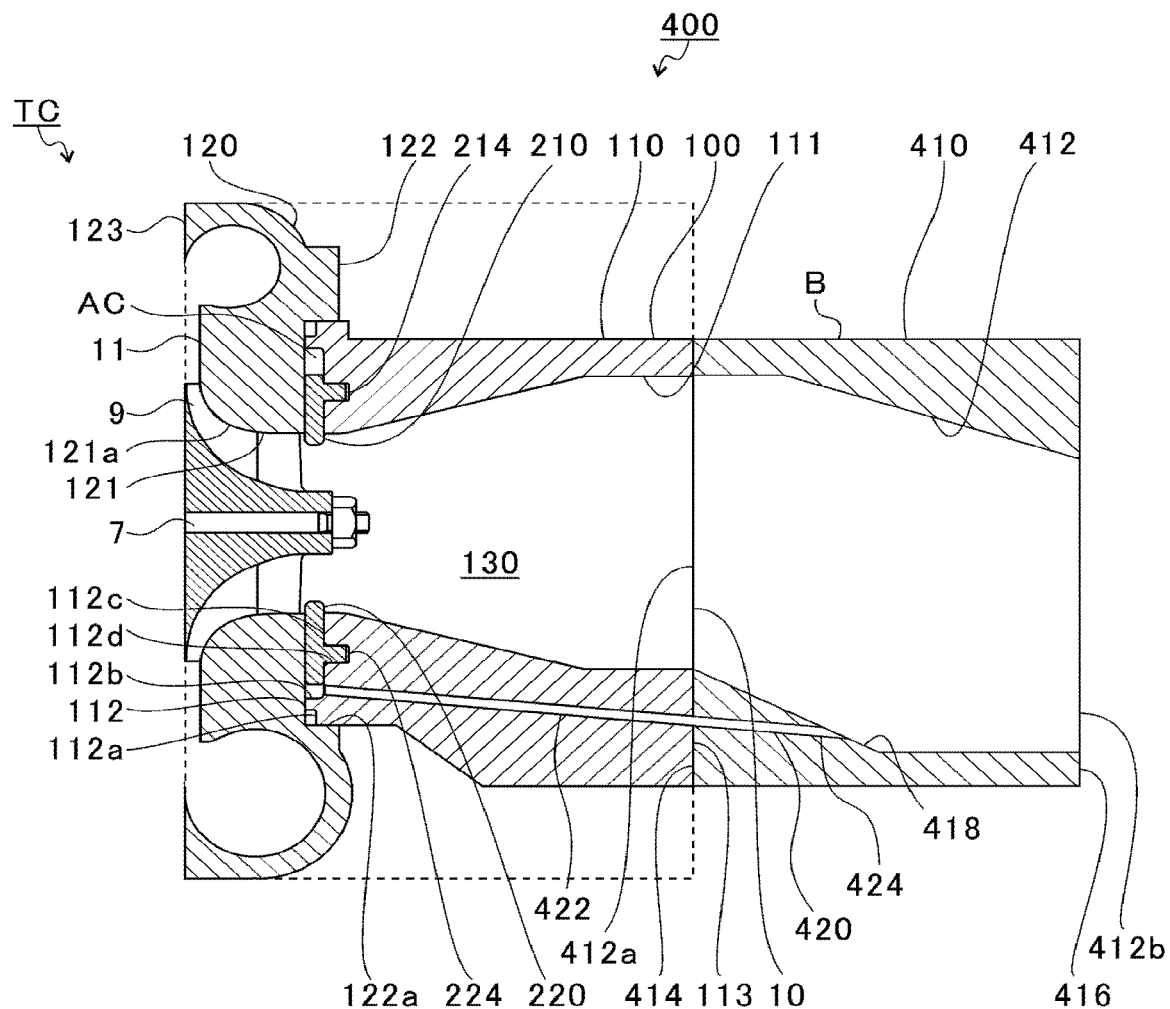
FIG. 8 is a schematic cross-sectional view of a drainage structure of a first variation.

FIG. 8 is a schematic cross-sectional view of a drainage structure 400 of a first variation. Components substantially equal to those of the drainage structure 300 of the above embodiment are marked with the same sign, and descriptions thereof are omitted. The drainage structure 400 of the first variation differs from the drainage structure 300 of the above embodiment in that the main body B is provided with a third housing member 410 in addition to the first housing member 110 and the second housing member 120. The drainage structure 400 of the first variation differs from the drainage structure 300 of the above embodiment in that it does not comprise the groove 320.

As shown in FIG. 8, the drainage structure 400 includes the main body B, the compressor impeller 9, the accommodation chamber AC, the first movable member 210, the second movable member 220, the connecting member 230 (see FIG. 3), and a connecting passage 420. The main body B includes the first housing member 110, the second housing member 120, and the third housing member 410.

The third housing member 410 is a connectable member that can be connected to the first housing member 110 (e.g., an intake piping). The third housing member 410 includes a through hole 412 formed therein. The through hole 412 extends from one end surface 414 to the other end surface 416 in the third housing member 410. An opening 412a of the through hole 412 is formed in the one end surface 414 of the third housing member 410. An opening 412b of the through hole 412 is formed in the other end surface 416 of the third housing member 410.

The one end surface 414 of the third housing member 410 is connected to the end surface 113 of the first housing member 110. In this state, the inlet 10 is connected to the opening 412a, and the through hole 111 and the through hole 412 are connected to each other. The through hole 412 and the through holes 111 and 121 form the intake flow path 130.

The inner diameters of the openings 412a and 412b are substantially equal to the inner diameter of the inlet 10. At least a portion of the opening 412b is positioned vertically below the inlet 10 and the opening 412a. The through hole 412 includes a bend (depression) 418 that is vertically lower than the inlet 10 (through hole 111).

The connecting passage 420 is formed in the main body B (the first housing member 110 and the third housing member 410). One end of the connecting passage 420 is connected to the accommodation chamber AC, and the other end opens (connects) to the intake flow path 130 at a position upstream of the accommodation chamber AC in the flow of the intake air. Since the connecting passage 420 is connected to the accommodation chamber AC, the condensate in the accommodation chamber AC can be discharged outside the accommodation chamber AC.

The connecting passage 420 includes a first connecting passage 422 and a second connecting passage 424. One end of the first connecting passage 422 is connected to the accommodation chamber AC, and the other end is opened on the end surface 113 that is radially outside the inlet 10. One end of the second connecting passage 424 is opened on the end surface 414 that is radially outside the opening 412a, and the other end is opened on (connected to) the bend 418

(i.e., the intake flow path 130). When the end surface 113 of the first housing member 110 and the one end surface 414 of the third housing member 410 are connected, the first connecting passage 422 is in communication with the second connecting passage 424.

The connecting passage 420 is formed vertically below the intake flow path 130 in the main body B. The connecting passage 420 is connected to the accommodation chamber AC at a position that is vertically below the intake flow path 130.

The connecting passage 420 is connected to the accommodation chamber AC at a position that is vertically below the lowermost position among the movable ranges of the first movable member 210, the second movable member 220, and the connecting member 230 in the vertical direction (see FIG. 4). The condensate is stored in a vertically lower part in the accommodation chamber AC. Therefore, it is preferable that the connecting passage 420 is connected to the vertically lowermost position of the accommodation chamber AC.

Compared with the case where the connecting passage 420 is formed vertically above the intake flow path 130, the condensate stored in the accommodation chamber AC can be discharged more easily.

As shown in FIG. 8, in the cross section including the axis center of the shaft 7, the connecting passage 420 is inclined downward as being spaced apart from the accommodation chamber AC. The position of the connecting passage 420 connected to the intake flow path 130 is vertically below the position connected to the accommodation chamber AC.

This makes it easier for the condensate in the accommodation chamber AC to move from one end where the connecting passage 420 is connected to the accommodation chamber AC to the other end of the connecting passage 420. Accordingly, the connecting passage 420 can make it easier to discharge the condensate in the accommodation chamber AC to the outside of the accommodation chamber AC.

The condensate stored in the accommodation chamber AC is discharged through the connecting passage 420 to the bent portion 418. The bent portion 418 is positioned vertically below the through hole 111. Therefore, the condensate discharged into the bent portion 418 is difficult to flow into the through hole 111. Thus, even if the temperature of the environment outside the centrifugal compressor C decreases and the condensate freezes, the frozen condensate is unlikely to adversely affect the compressor impeller 9, the accommodation chamber AC, the first movable member 210, the second movable member 220, and the connecting member 230 (part of the link mechanism 200).

As described above, the drainage structure 400 of the first variation comprises the connecting passage 420 that is connected to the accommodation chamber AC. As a result, freezing of the condensate in the accommodation chamber AC in the centrifugal compressor C can be inhibited.

Figure 9:
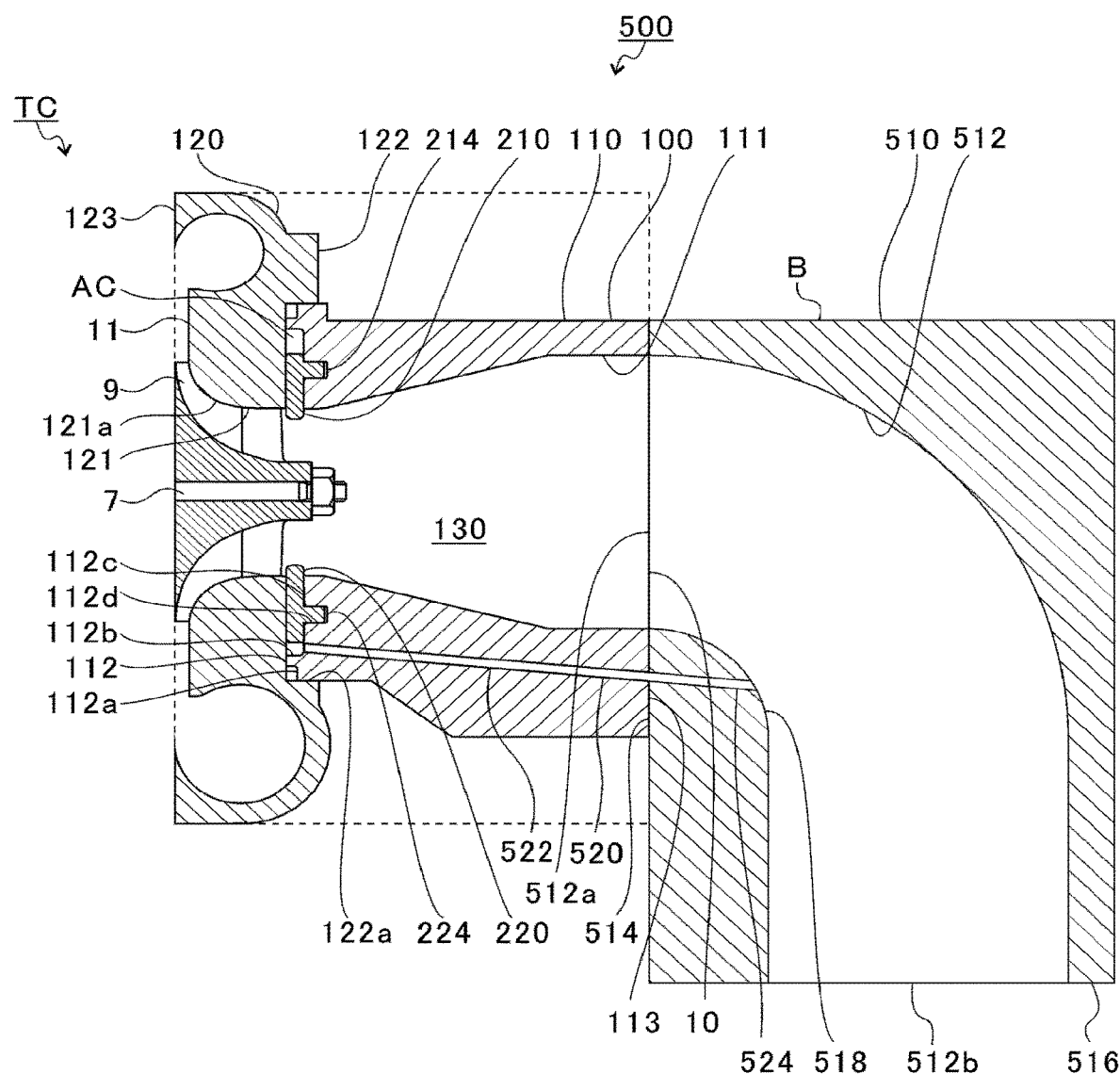
FIG. 9 is a schematic cross-sectional view of a drainage structure of a second variation.

FIG. 9 is a schematic cross-sectional view of a drainage structure 500 of a second variation. Components substantially equal to those of the drainage structure 300 of the above embodiment are marked with the same sign and descriptions thereof are omitted. The drainage structure 500 of the second variation differs from the drainage structure 300 of the above embodiment in that the main body B comprises a third housing member 510 in addition to the first housing member 110 and the second housing member 120. The drainage structure 500 of the second variation differs from the drainage structure 300 of the above embodiment in that it does not include the groove 320.

As shown in FIG. 9, the drainage structure 500 includes the main body B, the compressor impeller 9, the accommodation chamber AC, the first movable member 210, the second movable member 220, the connecting member 230 (see FIG. 3), and a connecting passage 520. The main body B includes the first housing member 110, the second housing member 120, and the third housing member 510.

The third housing member 510 is a connectable member that can be connected to the first housing member 110 (e.g., an intake piping). The third housing member 510 has a through hole 512 formed therein. The through hole 512 extends from one end surface 514 of the third housing member 510 to the other end surface 516. The through hole 512 is curved from a horizontal direction to a vertically downward direction. The through hole 512 extends horizontally from the one end surface 514 and vertically downward to the other end surface 516. An opening 512a of the through hole 512 is formed in the one end surface 514 of the third housing member 510. An opening 512b of the through hole 512 is formed in the other end surface 516 of the third housing member 510.

The one end surface 514 of the third housing member 510 is connected to the end surface 113 of the first housing member 110. In this state, the intake port 10 is connected to the opening 512a, and the through hole 111 and the through hole 512 are connected to each other. The through hole 512 and the through holes 111 and 121 form the intake flow path 130.

The inner diameters of the openings 512a and 512b are substantially equal to the inner diameter of the inlet 10. At least a portion of the opening 512b is positioned vertically below the inlet 10 and the opening 512a. A curved portion 518 is formed in the through hole 512 that is vertically below the inlet 10 (through hole 111).

The connecting passage 520 is formed in the main body B (the first housing member 110 and the third housing member 510). One end of the connecting passage 520 is connected to the accommodation chamber AC, and the other end opens (connects) to the intake flow path 130 at a position upstream of the accommodation chamber AC in the flow of the intake air. Since the connecting passage 520 is connected to the accommodation chamber AC, the condensate in the accommodation chamber AC can be discharged to the outside the accommodation chamber AC.

The connecting passage 520 includes a first connecting passage 522 and a second connecting passage 524. One end of the first connecting passage 522 is connected to the accommodation chamber AC, and the other end is opened on the end surface 113 that is radially outside the inlet 10. One end of the second connecting passage 524 is opened on the end surface 514 that is radially outside the opening 512a, and the other end is opened on (connected to) the curved portion 518 (i.e., the intake flow path 130). When the end surface 113 of the first housing member 110 and the one end surface 514 of the third housing member 510 are connected to each other, the first connecting passage 522 is in communication with the second connecting passage 524.

The connecting passage 520 is formed vertically below the intake flow path 130 in the main body B. The connecting passage 520 is connected to the accommodation chamber AC at a position that is vertically below the intake flow path 130.

The connecting passage 520 is connected to the accommodation chamber AC at a position that is vertically below the lowermost position among the movable ranges of the first movable member 210, the second movable member 220, and the connecting member 230 (see FIG. 4) in the vertical direction. The condensate is stored in a vertically lower part of the accommodation chamber AC. Therefore, it is preferable that the connecting passage 520 is connected to the vertically lowermost position of the accommodation chamber AC.

Compared with the case where the connecting passage 520 is formed vertically above the intake flow path 130, the condensate stored in the accommodation chamber AC can be discharged more easily.

As shown in FIG. 9, the connecting passage 520 is inclined vertically downward as being spaced apart from the accommodation chamber AC in a cross section including the axis center of shaft 7. The position of the connecting passage 520 connected to the intake flow path 130 is vertically below the position connected to the accommodation chamber AC.

This makes it easier for the condensate in the accommodation chamber AC to move from one end where the connecting passage 520 is connected to the accommodation chamber AC to the other end of the connecting passage 520. Accordingly, the connecting passage 520 can make it easier to discharge the condensate in the accommodation chamber AC to the outside the accommodation chamber AC.

The condensate stored in the accommodation chamber AC is discharged into the curved portion 518 through the connecting passage 520. The condensate discharged into the curved portion 518 falls vertically downward along the through hole 512. Therefore, even if the temperature of the environment outside the centrifugal compressor C decreases and the condensate freezes, the frozen condensate is difficult to adversely affect the compressor impeller 9, the accommodation chamber AC, the first movable member 210, the second movable member 220, and the connecting member 230 (part of the link mechanism 200).

As described above, the drainage structure 500 of the second variation comprises a connecting passage 520 connected to the accommodation chamber AC. As a result, freezing of condensate in the accommodation chamber AC in the centrifugal compressor C can be inhibited.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiments and variations, the examples are described in which the positions of the connecting passages 310, 420 and 520 connected to the intake flow path 130 are vertically below the positions connected to the accommodation chamber AC in the cross-section vertical to the rotational axis direction. However, the connecting passages 310, 420 and 520 are not limited thereto, and may be connected to the accommodation chamber AC at a position that is vertically equal to the intake flow path 130 in a cross-section vertical to the rotational axis direction. In other words, the connecting passages 310, 420 and 520 may be formed at a position equal to the intake flow path 130 in the vertical direction.

In the above embodiments and variations, the examples are described in which the positions of the connecting passages 310, 420 and 520 connected to the intake flow path 130 are vertically below the positions connected to the accommodating chamber AC. However, the connecting passages 310, 420 and 520 are not limited thereto, and may be connected to the intake flow path 130 at a position that is vertically above the positions connected to the accommodation chamber AC, or vertically equal to the positions connected to the accommodation chamber AC.

In the above embodiments and variations, the examples in which the EGR gas is supplied from the exhaust gas recirculation device A to the intake flow path 130 is described. However, the present disclosure is not limited thereto, and the exhaust gas recirculation device A may not be provided. Since the intake air contains moisture (water vapor), the condensate may be stored in the accommodation chamber AC and the condensate may freeze, even if the EGR gas is not supplied to the intake flow path 130.

What is claimed is:

1. A drainage structure comprising:
a main body including an intake flow path;
a compressor impeller disposed in the intake flow path;
an accommodation chamber formed in the main body at a position upstream of the compressor impeller in a flow of an intake air;
a movable member disposed in the accommodation chamber, the movable member being movable to a throttle position where the movable member protrudes into the intake flow path and to a retracted position where the movable member does not protrude into the intake flow path; and
a connecting passage connected to the accommodation chamber,
wherein the connecting passage fluidly communicates with the intake flow path at a position of the intake flow path upstream of the accommodation chamber, and wherein the connecting passage comprises an outlet, and a position of the outlet is vertically below a position of the connecting passage connected to the accommodation chamber.

2. The drainage structure according to claim 1, wherein the movable member moves in a radial direction of the compressor impeller.

3. The drainage structure according to claim 1, wherein the connecting passage is formed vertically below the intake flow path in the main body.

4. The drainage structure according to claim 1, further comprising:
a groove formed upstream of the accommodation chamber in the main body, and opening to the intake flow path,
wherein the connecting passage connects the accommodation chamber with the groove.

5. A turbocharger comprising the drainage structure according to claim 1.

* * * * *